United States Patent [19]

Duga

[11] 4,299,371

[45] Nov. 10, 1981

[54] NECK RING ASSEMBLY

[75] Inventor: Robert J. Duga, Enfield, Conn.

[73] Assignee: Emhart Industries, Inc., Hartford, Conn.

[21] Appl. No.: 181,053

[22] Filed: Aug. 25, 1980

Related U.S. Application Data

[63] Continuation-in-part of Ser. No. 13,413, Feb. 21, 1979, abandoned.

[51] Int. Cl.³ ............................ B29C 7/00; B29F 1/14
[52] U.S. Cl. ........................................ 249/68; 249/59;
425/525; 425/537; 425/444; 425/556
[58] Field of Search ............... 425/525, 533, 537, 556,
425/441, 443, 444; 249/57, 59, 67, 68

[56] References Cited

U.S. PATENT DOCUMENTS

| | | | |
|---|---|---|---|
| 3,264,684 | 8/1966 | Moslo | 425/525 |
| 3,899,279 | 8/1975 | Hudson et al. | 425/525 |
| 3,954,370 | 5/1976 | Pollock et al. | 425/441 X |

*Primary Examiner*—Jan H. Silbaugh
*Attorney, Agent, or Firm*—A. W. Breiner

[57] ABSTRACT

A neck ring assembly including ejector pins for engaging a parison finish for holding a parison centrally within a neck ring upon the initial opening of the assembly in a positive stripping action. After a small amount of neck ring opening, the neck rings are free of the parison finish permitting no further side load on the take-out mechanism. The stripping mechanism including ejector pins is then completely drawn away from the parison to allow the parison to be removed. The device is simple in construction, has few moving parts, and requires no auxiliary power for operation.

8 Claims, 9 Drawing Figures

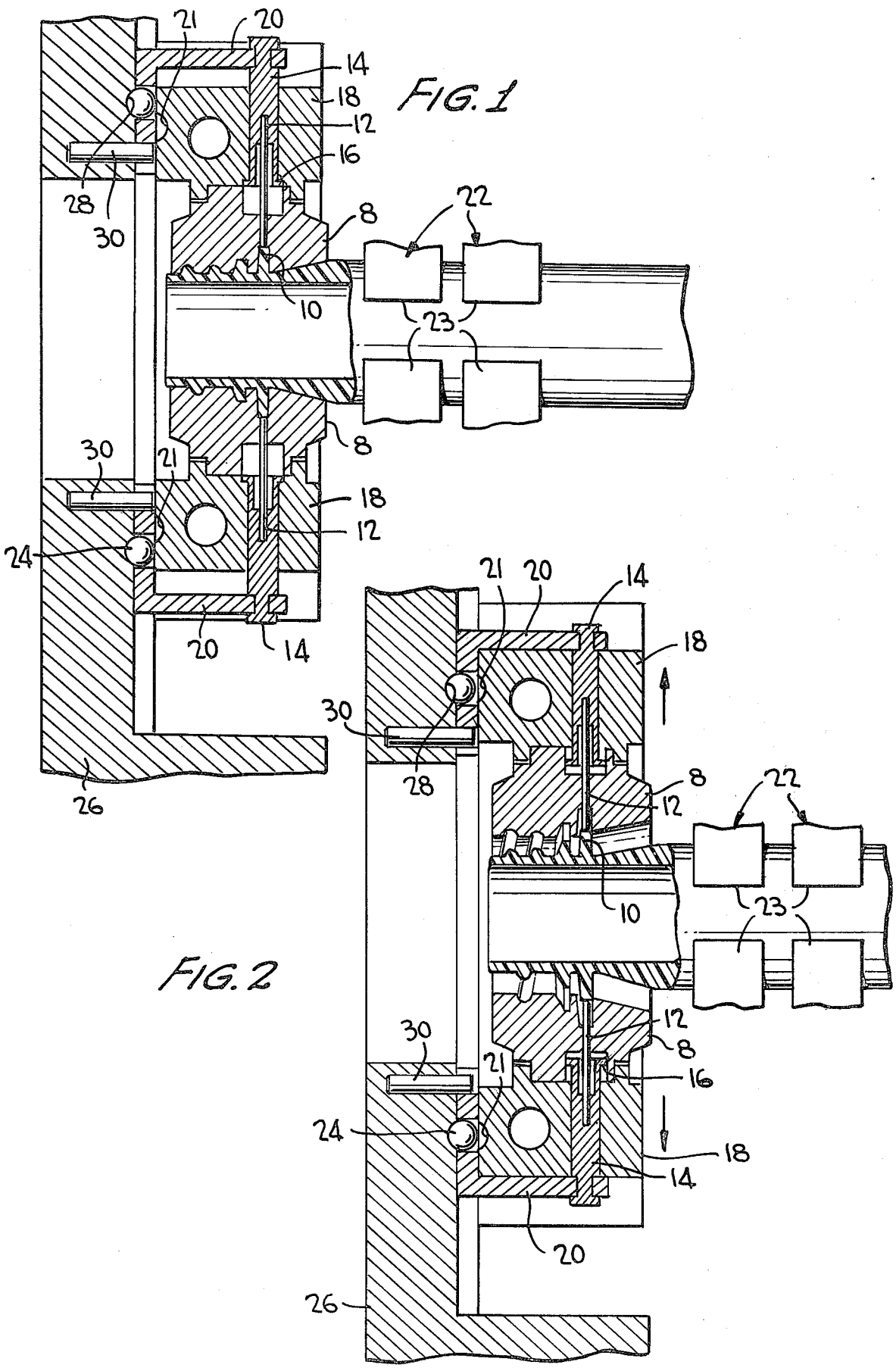

NECK RING ASSEMBLY

This application is related to commonly assigned Spurr and Duga application Ser. No. 013,417 filed Feb. 21, 1979 entitled "Improved Delay Stretch And Blow Machine System," and is a continuation-in-part of application Ser. No. 013,413 filed Feb. 21, 1979, now abandoned.

This invention relates to neck ring assemblies for forming the finish on a plastic bottle. More particularly, this invention relates to a neck ring assembly satisfactory for use in a machine system for the injection molding of a plastic parison in a parison-forming mold and blowing of the parison to form a finished bottle in a continuous operation.

In recent years substantial effort has been directed to the formation of plastic bottles as a replacement or partial replacement for glass bottles. In the prior art machine systems and processes for making the plastic bottles, a parison or preform is first made in an injection mold. The preform includes the neck finish of the final bottle. Accordingly, precision and avoidance of defect in the neck ring finish made with the neck ring assembly of the mold is critical, both at the time of the injection molding and at the time that the neck finish is stripped from the parison and/or finished bottle.

It is not uncommon to use the neck ring assembly in a hot-blow or one-stage process and system after formation of the preform as a means of transferring the parison from the injection mold to the blow mold while the preform remains hot or at the blowing temperature of the preform. More recently, to conserve time and to make the most efficient use of all components of a hot-blow machine system, a hot-blow or one-step machine system and process for the formation of plastic bottles was described in commonly assigned Spurr and Duga application Ser. No. 805,918, now U.S. Pat. No. 4,140,464, wherein the number of blow molds in the system is fewer in number than the number of parison or injection molds. A parison storage area is provided between the parison-forming and blowing stations. In such a system highly efficient use is made of both the injection molding equipment and the blow-molding equipment.

In such a delay stretch and blow system it is desirable, if not essential, to strip the neck ring assembly used to make the neck finish while the parison is still hot. The stripping must be accomplished rapidly and preferably while the preform is being transferred from the parison mold to the storage area. Moreover, it is essential when handling the hot parison to use a relatively low uniform force, since an uneven or a high force can result in physical damage to the parison and can also affect the final bottle due to the variation in heat history caused by the mechanism surface contact pressure. It has been found that even with uniform and low holding force, parison damage can result during neck ring opening as the parison is being held centrally and the parison finish or flange sticks to one side of the neck ring as the neck ring opens. This sticking action results in a large side load on the centrally held parison which can cause parison damage or heat history change leading to a defective blown bottle.

The present invention is directed to a neck ring assembly including ejector pins for engagement with the parison finish whereby the parison is held centrally within the neck ring assembly upon its initial opening in a positive stripping action. After a small amount of neck ring opening, the neck ring is free of the parison finish permitting no further side load on the take-out mechanism. The stripping mechanism including the ejector pins and the neck ring is then drawn away from the parison to allow the parison to be removed.

DRAWING AND GENERAL DESCRIPTION

In the drawing, which illustrates in detail preferred embodiments and modes of operation, FIG. 1 is a cross-sectional view of one preferred embodiment of the neck ring assembly of the present invention in the closed position, but separated from the injection mold, retaining a finished preform held by a pair of transfer gripper jaws;

FIG. 2 is a cross-sectional view similar to FIG. 1 but with the neck ring assembly being partially opened;

Figure 3:
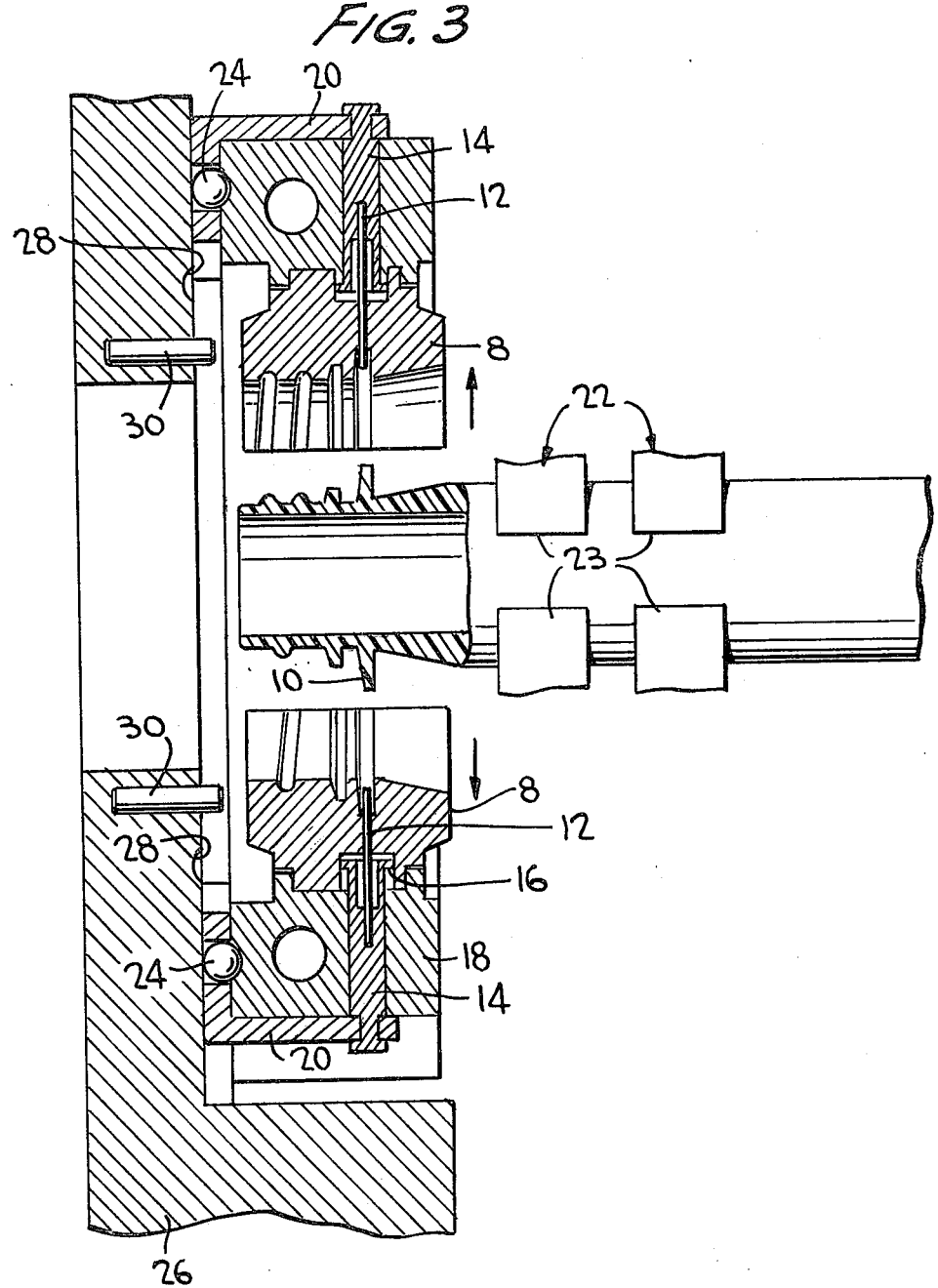
FIG. 3 is a cross-sectional view similar to FIG. 1 but with the neck ring assembly in the fully opened position and the preform ready to be removed from the neck finish.

Referring first to FIG. 1, each neck ring assembly comprises upper and lower neck ring halves 8, and an ejector pin 12 which engages the neck finish flange 10 at each side of the neck ring. The ejector pin 12 is secured by brazing or the like to an ejector pin plunger 14. The plunger is seated at its shoulder 16 on a neck ring retainer 18. During injection of plastic into the preform mold the neck ring is closed as shown in FIG. 1. High-pressure plastic in the parison flange area loads the ejector pin 12 through the neck ring finish secured to ejector pin plunger 14. The seating of ejector pin shoulder 16 on the neck ring retainer 18 precludes the pressure load from being applied to the ejector detent mechanism to be described hereinafter. It is to be understood, however, that the shoulder is not essential in all cases. The shoulder permits a higher degree of ejector pin control, most critical at higher pressure loads. If shoulder 16 is not present, the injection pressure load will be applied to the ejector detent mechanism, i.e., roller 24 of the drawing.

After the injection mold, not shown, is opened and stripped from the parison, a parison take-out mechanism 22 is brought in to secure the parison. The parison take-out mechanism comprises a pair of gripper jaws, each gripper jaw containing two separate spring-loaded and insulated fingers 23 as defined in copending application Ser. No. 013,417 entitled "Improved Delay Stretch And Blow Machine System."

After the parison has been secured by the fingers of the gripper jaws, the neck ring upper and lower halves 8, along with their corresponding neck ring retainers 18, begin to separate as shown in FIG. 2. Ejector pin 12 and ejector pin plunger 14 which are attached to ejector pin plate 20 initially cannot move since they are held by roller 24 which is trapped by neck ring retainer 18 in detent 28 in the stationary neck ring plate 26. After the neck ring halves 8 and retainer 18 travel a sufficient amount to ensure that the parison is free of the neck ring, the neck ring retainer 18 contacts the ejector pin plate 20. By design the retainer detent 21 is now aligned with detent 28 in the neck ring plate 26 allowing roller 24 to transfer into detent 21. However, since the neck ring retainer is now against the ejector pin plate 20, as the neck ring opens it pulls the ejector pin plate and, thus, the ejector pin along with it, and at the same time forces the roller into the neck ring retainer detent 21 locking the ejector pin plate to the neck ring retainer plate. This condition exists for the remainder of the opening stroke. As the neck ring begins to open the parison flange 10 is held central until it is free of the neck ring after which, as the neck ring continues to full open position as shown in FIG. 3, it draws the ejector pins away from the flange to allow removal of the preform. The ejector pin remains extended within the flange cavity of the neck ring. However, it is well away from the parison flange at full open position.

On closing, the neck ring retainer 26 and ejector pin plate 18 remain locked until the ejector pin plate strikes the stop pin 30. As designed, the two detents are again aligned. The ejector plate can go no further so the neck ring retainer forces the roller into the original detent 28 and traps it as it moves to the fully closed position as shown in FIG. 1. Since the ejector pin plate is stopped, the ejector pin is also stopped. As the neck ring goes to final closing, although the ejector pin is stationary, effectively, it is removed from the flange cavity.

The neck ring assembly of the present invention as is apparent provides a positive stripping action. There is a large ejector pin clearance for parison take-out and no additional power is required for operation. The device comprises few moving parts and is capable of being placed within a confined area.

Figure 4:
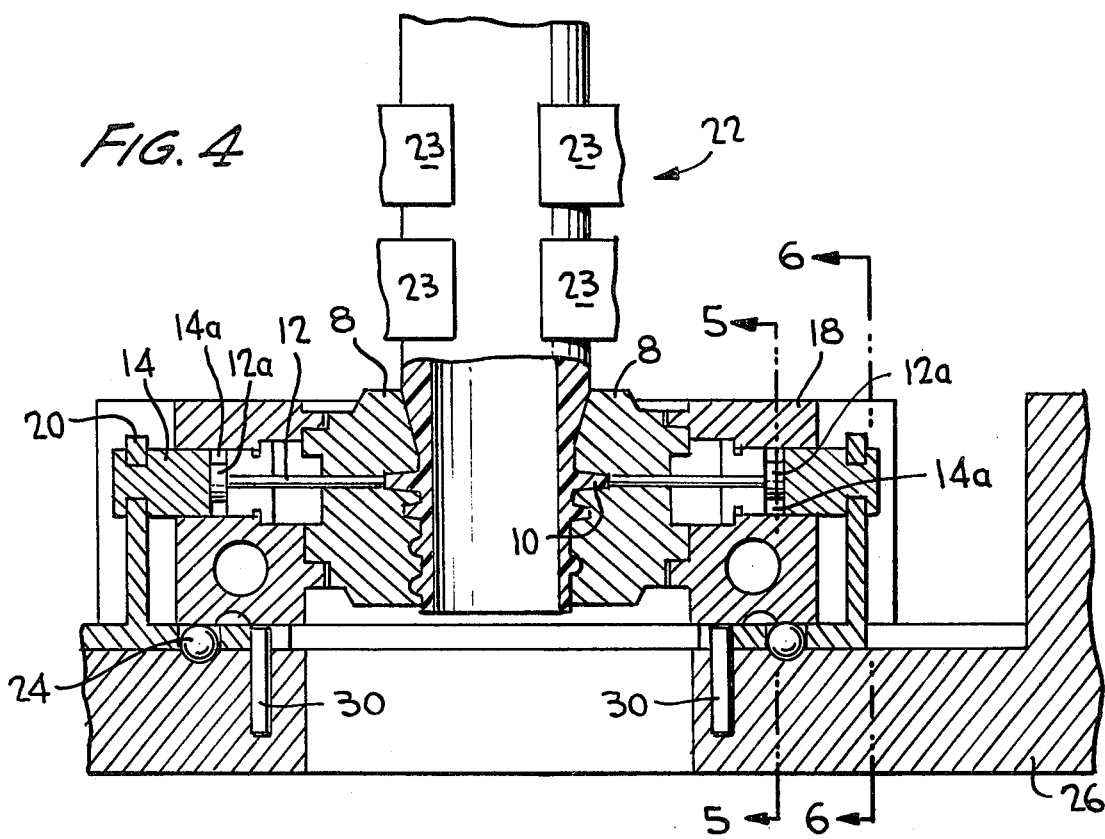
FIG. 4 is a cross-sectional view of a second preferred embodiment of the neck ring assembly of the present invention in the closed position, but separated from the injection mold, retaining a finished preform held by a pair of transfer gripper jaws.
Figure 5:
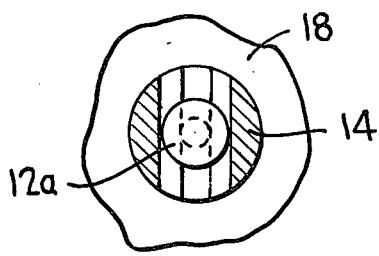
FIG. 5 is a cross-sectional view through 5—5 of FIG. 4 broken away and essentially showing only the ejector pin and ejector pin support.
Figure 6:
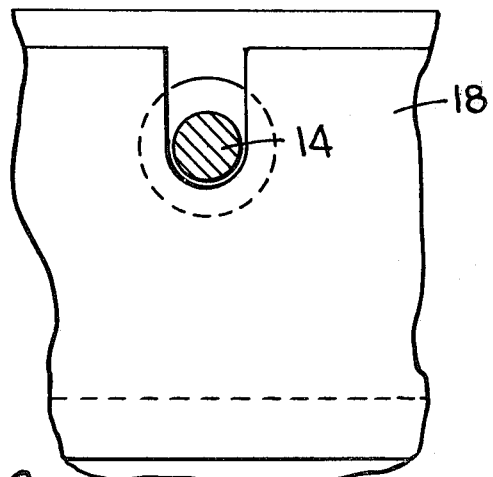
FIG. 6 is a section through 6—6 of FIG. 4 broken away so as to essentially show only the relation of the ejector pin support in the ejector pin plate.

Referring now to FIG. 4, there is shown a modified neck ring assembly utilizing a "floating" pin in contradistinction to the fixed pin shown in FIGS. 1-3. In FIGS. 1-3, the pin 12 is brazed to the ejector pin support or plunger 14. The relatively long length of the unguided portion of the brazed in pin allows for minor misalignments by flexing of the pin. The floating pin design as shown in FIG. 4 in certain aspects is preferred in that it not only allows for misalignment, but additionally allows for pin contact at various positions on the parison neck ring finish without moving the pin support which is basically more confined due to its large size. Thus, in FIG. 4 pin 12 floats within a cavity 14a of ejector pin support 14. The ejector pin support and ejector pin plate may protrude beyond the neck ring retainer bar in stroke direction since, when the neck rings are open, the ejector mechanism will have moved toward the retainer and will not protrude beyond the rear wall. The floating relation of the ejector pin head 12a in the ejector pin support 14 is shown in FIG. 5. The relation of the ejector pin support to ejector pin plate 20 is shown in FIG. 6.

Figure 7:
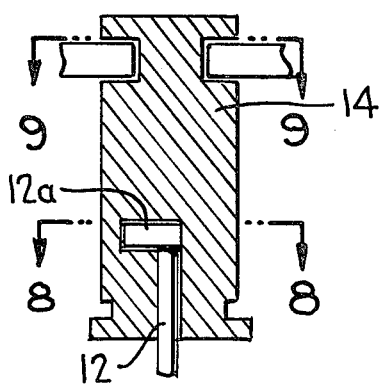
FIG. 7 is a perspective view of a modified ejector pin support and ejector pin.
Figure 8:
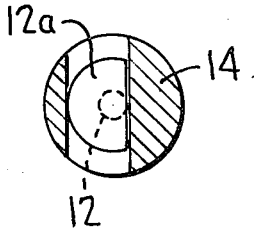
FIG. 8 is a sectional view through section 8—8 of FIG. 7.
Figure 9:
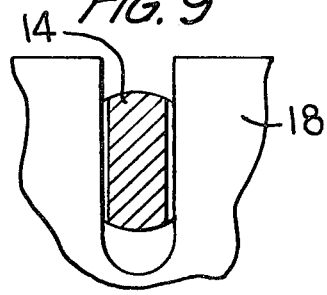
FIG. 9 is a view through section 9—9 of FIG. 7.

FIG. 7 illustrates a modified design of the ejector pin support 14 and ejector pin 12. In this design the ejector pin head or flange 12a has a D shape which prevents rotation of pin 12 which is preferable in the event the cavity end is shaped. FIG. 8 is a cross-section through line 8—8 of FIG. 7 showing further detail. FIG. 9 shows the relationship of neck ring support 14 to ejector pin plate 20.

As will be apparent to one skilled in the art, various modifications can be made to the herein-described neck ring assembly without departing from the inventive concept herein disclosed. For example only, whereas the preferred embodiments of FIGS. 1 and 4 utilize a flange 10 on the neck ring finish, it is not necessary that the finish include the flange or that the ejector pin engage the parison on a flange. The engagement, as will be readily apparent to one skilled in the art, can be anywhere on the neck ring finish. The relative point of contact of the ejector pin on the neck ring finish can be more readily adjusted as hereinbefore stated utilizing the floating pin concept as described in FIG. 4. These modifications being within the ability of one skilled in the art are to be embraced by the appended claims.

It is claimed:

1. A neck ring assembly for use in forming a parison comprising
   (a) upper and lower neck ring halves having a finish cavity in each of said halves, a neck ring retainer in contact with said neck ring halves, and a neck ring plate spaced from said neck ring retainer; said neck ring retainer and neck ring plate each having a detent therein;
   (b) an ejector pin plate in part movably positioned in said space between said neck ring plate and neck ring retainer, an ejector pin plunger for each of said neck ring halves secured at one end to said ejector pin plate and ejector pins secured at one end of each to each of said ejector pin plungers; and
   (c) detent means including traveling means carried by said ejector pin plate communicating between said detent in said neck ring plate and said detent in said neck ring retainer, and stop means for said ejector pin plate;

said ejector pins being in communication at one end through said neck ring halves with said finish cavities of said neck ring halves.

2. The neck ring assembly of claim 1 wherein said ejector pin plunger includes shoulders at the end opposite the end secured to said ejector pin plate with said shoulders engaging said neck ring retainer.

3. The neck ring assembly of claim 2 wherein said traveling means is a roller.

4. The neck ring assembly of claim 2 wherein said traveling means is a ball.

5. The neck ring assembly of claim 1 wherein said ejector pins are brazed into said ejector pin plungers.

6. The neck ring assembly of claim 1 wherein said ejector pins include a head portion and said ejector pin plungers include an opening for receiving said ejector pin head in floating relation thereto.

7. The neck ring assembly of claim 6 wherein said ejector pin head is shaped to prevent rotation of said ejector pin.

8. The neck ring assembly of claim 7 wherein said ejector pin head is D shaped.

* * * * *